UNITED STATES PATENT OFFICE.

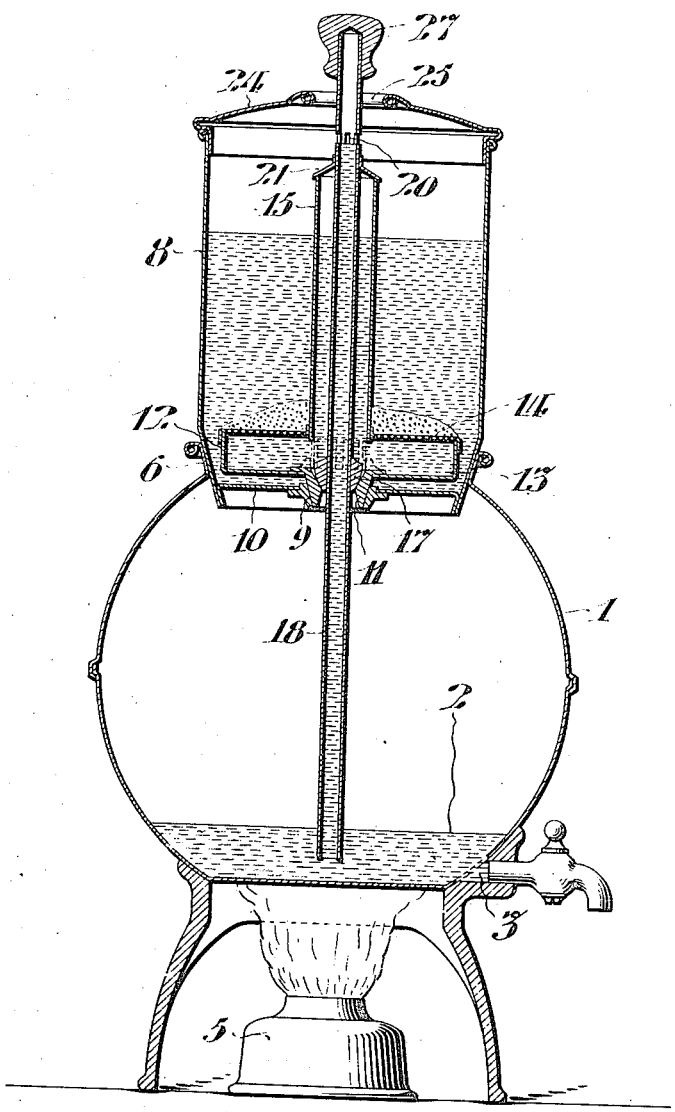

PROSPER JEAN AUGUSTE MAIGNEN, OF PHILADELPHIA, PENNSYLVANIA.

PERCOLATOR.

1,195,487.  Specification of Letters Patent.  Patented Aug. 22, 1916.

Application filed June 12, 1908. Serial No. 438,012.

*To all whom it may concern:*

Be it known that I, PROSPER JEAN AUGUSTE MAIGNEN, of Philadelphia, in the State of Pennsylvania, have invented a certain new and useful Improvement in Percolators, whereof the following is a specification, reference being had to the accompanying drawing.

My invention is particularly applicable to devices for making infusions of coffee, comprising means to control the degree of concentration of the infusion.

As hereinafter described, my invention includes a filtrate receptacle covered by a foraminous diaphragm which permits the infusion to filter into said receptacle, but excludes the coffee grounds, and said receptacle has an outlet aperture below said diaphragm controlled by a valve which may be opened and closed at the will of the operator by a rod extending upwardly through said diaphragm. In its simplest form, said filtrate receptacle may be formed in a vessel which is separable from said diaphragm and adapted to hold both coffee and infusion above said diaphragm. However, said filtrate receptacle may be a cup attached to said diaphragm and inclosed by a separate vessel which holds both the coffee and the infusion above said diaphragm. Moreover, said valve may be provided with a tubular stem, which, extending below the valve into a water heater, affords a passage for the water through it to the region above said diaphragm.

It may be observed that in making coffee with an ordinary percolator comprising a strainer supporting the coffee and through which the infusion may pass away from the coffee; when water is poured upon the coffee it at first passes therethrough very rapidly and consequently the infusion is so weak that it is necessary to repass it through the coffee; when the infusion is repassed through the coffee, it filters therethrough at a much slower rate than at first, and the contact of the infusion with the coffee may be necessarily so prolonged that some of the bitter and undesirable elements of the coffee are extracted. Therefore, my invention is advantageous in that it provides means to maintain the infusion in contact with the coffee for precisely the period of time found desirable, according to the quality of the coffee, to produce the desired degree of strength of the infusion, and, my invention also comprises means to rapidly and effectively separate the infusion from the coffee grounds.

My invention comprises the various novel features of construction and arrangement hereinafter more definitely specified.

The drawing shows a vertical sectional view of a percolator conveniently embodying my improvement.

In the form of my invention shown, the reservoir 1, for the liquid 2, is provided with the valve controlled outlet 3, and is in operative relation with the heater 5. Said reservoir 1, is provided at its top with the flange 6, for engagement with the liquid receptacle 8, which has the orifice 9, in its bottom wall 10, in which the tubular flange 11, of the hollow strainer casing 12, is removably fitted. Said strainer casing comprises the imperforate cup 13, covered by the foraminous diaphragm 14, in concentric relation with the tubular column 15. Said column is in alinement with said orifice, and the latter is normally closed by the valve 17, carried by the tubular rod 18, which extends from the liquid 2, in the receptacle 1, through said orifice 9, and column 15, and is provided above the latter with the ports 20, through which hot water may be delivered, by steam pressure, from the receptacle 1, to said receptacle 8; the top of said column being covered by the cap 21, carried by said rod 18. Said receptacle 8, is provided with the removable cover 24, having the central aperture 25, through which said rod 18, extends, and the latter is provided above said cover with the knob handle 27.

Although as shown, a foraminous diaphragm may be conveniently formed of perforated sheet metal of such gage as to exclude ordinary granulated coffee; it is to be understood that other foraminous material may be employed, for instance, wire cloth, porous stone ware, or textile fabric. If the foraminous diaphragm 14, is required to exclude pulverized coffee or other fine substance, the filtering surface may be covered with asbestos fiber, paper pulp, or filtering cloth in any convenient manner.

Although the valve seat cannot be obstructed by the coffee or other material treated, because such material is excluded by the strainer casing which incloses the valve and its seat; I prefer to form said valve of curved conical configuration, so that it may be easily fitted into its seat, and, reduce to the minimum the surface of the seat in contact with the valve, so that the valve may be readily removed and replaced without frictionally disturbing the device.

It may be observed that, in each instance described, the strainer column not only serves to guide the valve and its stem to and from the valve seat, but affords a convenient air vent for the spaces below the foraminous diaphragm.

In making coffee, the strainer being fitted in place in the receptacle in which the infusion is to be made, and the valve closed; the strainer diaphragm may be covered with coffee and boiling water added. The coffee being then allowed to soak until the proper degree of concentration of the infusion has been attained, the valve may be either intermittently raised from its seat to permit the discharge of the infusion, or the valve may be entirely removed from the percolator and the infusion be allowed to filter through the diaphragm and discharge aperture into any suitable reservoir.

Although a strainer comprising a single foraminous diaphragm, as described, is sufficient for percolators of small capacity; in percolators of larger capacity, requiring a greater area of filtering surface, I provide a series of foraminous strainer casings, attached one above the other to a single central column having ports through which the filtrate enters said column.

I do not desire to limit myself to the precise details of construction and arrangement herein described, as it is obvious that various modifications may be made therein, without departing from the essential features of my invention as defined in the appended claims.

I claim:—

1. In a percolator, the combination with a water receptacle, having an annular flange at its top; of an infusion receptacle fitted to said flange and having an orifice leading to said water receptacle; a strainer cup having a flange fitted to said orifice and an aperture in concentric relation with said flange; a valve fitted to said aperture; a tubular valve rod extending below the water level in said water receptacle and above the liquid level in said infusion receptacle; a foraminous diaphragm covering said cup; a tubular column on said diaphragm inclosing said valve rod; a removable cover for said infusion receptacle having a central aperture for said rod; and a handle on said rod above said cover.

2. In a percolator, the combination with a water receptacle; of an infusion receptacle detachably fitted upon the top of said water receptacle and having an orifice leading to the latter; a strainer cup having a flange fitted to said orifice and an aperture in concentric relation with said flange; a valve fitted to said aperture; a tubular valve rod extending below the water level in said water receptacle and above the liquid level in said infusion receptacle; a foraminous diaphragm covering said cup; a tubular column on said diaphragm, inclosing said valve rod; and a removable cover for said infusion receptacle having a central aperture for said rod.

In testimony whereof, I have hereunto signed my name at Philadelphia, Pennsylvania, this 26th day of May, 1908.

PROSPER JEAN AUGUSTE MAIGNEN.

Witnesses:
ARTHUR E. PAIGE,
ANNA F. GETZFREAD.